Patented Aug. 23, 1932

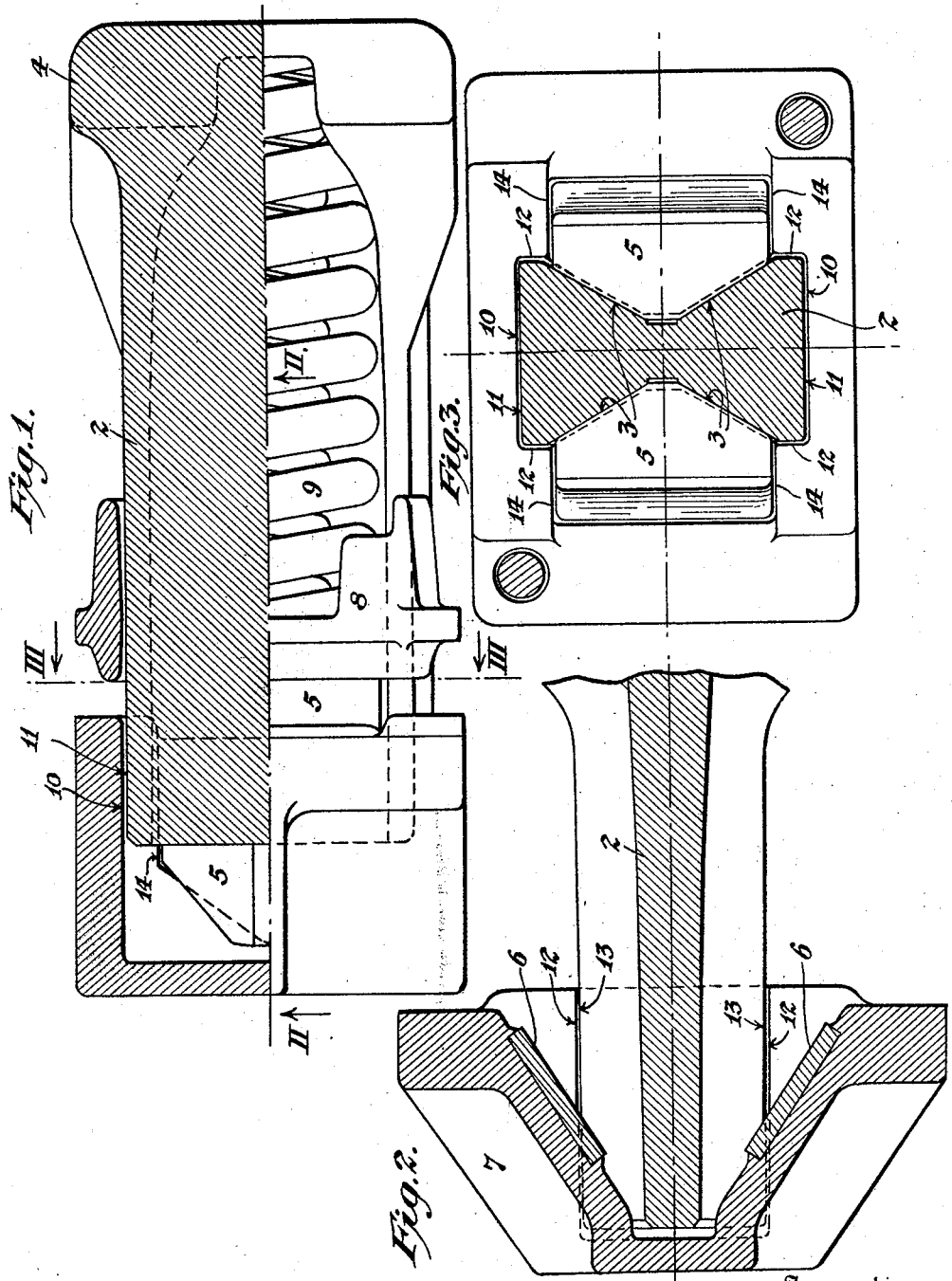

1,872,978

UNITED STATES PATENT OFFICE

HARRY T. KRAKAU, OF CLEVELAND, OHIO, ASSIGNOR TO NATIONAL MALLEABLE AND STEEL CASTINGS COMPANY, OF CLEVELAND, OHIO, A CORPORATION OF OHIO

SHOCK ABSORBING MECHANISM

Application filed August 2, 1927. Serial No. 210,052.

My invention relates to frictional shock absorbing mechanism, and particularly to frictional shock absorbing mechanism of the included friction type. I have observed in the operation of draft gears for railway cars that when the coupler is angled laterally buffing blows are apt to be transmitted to one side of the center of the follower wedge and the resulting thrust upon the friction shoes causes them to bear harder at one side of the central friction member than at the other. This is apt to result in loss of frictional capacity.

I have found that by making the follower wedge so that it will have a close fit with the sides of the central member and extending it rearwardly so as to provide extended bearings on the surfaces of the arms of the central member, so as to hold the central member and the wedge closely in alignment during buffing and pulling, the tipping or angling of the wedge and the resulting disturbance of the other parts relative to the central member may be prevented. My invention also comprises various other features which I shall hereinafter describe and claim.

In the accompanying drawing, Fig. 1 is a side elevation, partly in section, showing a draft gear of the included friction type embodying my invention; Fig. 2 is a partial section on lines II—II of Fig. 1, showing, however, only the wedge and central member; and Fig. 3 is a section on lines III—III of Fig. 1.

Referring more specifically to the drawing, I have shown the central friction member 2 with longitudinally extending friction faces 3 at its sides and terminating at its rear end in an enlarged base 4. A friction shoe 5 seats upon each V-shaped friction face 3. Each friction shoe 5 is engaged by the wedging surface 6 of the wedge follower 7. The shoes 5 are engaged at their rear sides by the segment seat 8, which in turn forms a bearing for the forward ends of the spring elements 9, which at their rear ends bear against the base 4 of the central member.

The wedge has surfaces 10 which engage corresponding surfaces 11 on the central friction member, which serve to hold the wedge in alignment with the shoe and prevent vertical movement of the wedge relative to the central member, while the surfaces 12 on the wedge and 13 on the member serve to guide the wedge and hold it against lateral movement. I have also constructed the friction shoes so that they have a fairly close fit between the faces 14 on the wedge, and thus are also guided in their operative movements. The segment seat 8 is also closely fitted to the central friction member, and hence is maintained in correct relation during the movements of the gear.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In frictional shock absorbing mechanism, a longitudinally extending included friction member having a plurality of diverging longitudinally extending friction faces and a plurality of sets of guiding faces, the faces of each set being parallel and at an angle to the faces of the other sets; friction shoes engaging said friction faces; a wedge engaging such friction shoes and also having guiding surfaces engaging the said guiding faces on the included member and lying closely adjacent the sides of the shoes, whereby the parts of the gear are maintained in alignment and said friction member is held against relative transverse movements in all directions; a spring seat surrounding said friction member and closely fitted thereto;

and compression spring elements cooperating between said seat and said friction member.

2. In friction shock absorbing mechanism, a longitudinally extending friction member having divergent friction surfaces, a wedge; friction shoes movable longitudinally of said member by said wedge, and a compression spring element, said friction member and wedge each having a plurality of sets of adjoining guiding surfaces extending longitudinally of said member and arranged parallel to the direction of motion of said wedge but in a plurality of planes whereby said wedge is guided against substantial vertical or lateral displacement relative to said friction member, and said wedge and shoes having cooperating guide surfaces in close proximity for preventing relative lateral displacement thereof.

3. In frictional shock absorbing mechanism, a longitudinally extending friction member having diverging friction surfaces, friction shoes in contact with said member and movable longitudinally thereof, a wedge member engaging said shoes for forcing them into frictional contact with said friction member; a spring seat cooperating with said friction member and guided against lateral movement in all directions thereby, and a compression spring element cooperating between said seat and said friction member, said wedge and friction member being provided with a plurality of sets of guiding faces, certain of the faces of each set being arranged in a plane at an angle to the plane of the other faces of the set, each of said sets on the wedge enclosing a portion of the friction member on a plurality of sides, whereby the parts of said mechanism are maintained in alignment.

4. In a friction shock absorbing mechanism, a longitudinally extending friction member; a wedge; friction shoes movable longitudinally of said member by said wedge, and a compression spring element, said friction member being provided with pairs of angularly arranged friction faces, said friction shoes each engaging a pair of said friction faces and being guided longitudinally thereby, parallel guiding faces on said shoes for engagement with corresponding faces on said wedge, said wedge and friction member being also provided with co-acting guiding faces certain of which are at right angles to each other and at an angle to the guiding faces on said shoes whereby said wedge is guided by said shoes and by said friction member.

5. In a frictional shock absorbing mechanism, a longitudinally extending included friction member having a plurality of diverging longitudinally extending friction faces and non-diverging guiding faces, the guiding faces being arranged in groups of adjacent, angularly disposed surfaces, friction shoes engaging said friction faces, a wedge having wedging faces engaging the friction shoes and guide faces immediately adjacent the sides of the shoes for preventing lateral displacement thereof and also having a telescopic guiding fit with the said guiding faces of said friction member, said parts being arranged so that the friction member is held in all directions against relative transverse movement with respect to the wedge, and a spring adapted to resist inward movement of the shoes.

HARRY T. KRAKAU.